US012453443B2

(12) United States Patent
Cordsen et al.

(10) Patent No.: US 12,453,443 B2
(45) Date of Patent: Oct. 28, 2025

(54) DEVICE COMMUNICATION FOR HYGIENE COMPLIANCE

(71) Applicant: GPCP IP Holdings LLC, Atlanta, GA (US)

(72) Inventors: Erik Allen Cordsen, Suwanee, GA (US); Dani Itzhak Stern, Atlanta, GA (US)

(73) Assignee: GPCP IP Holdings LLC

( * ) Notice: Subject to any disclaimer, the term of this patent is extended or adjusted under 35 U.S.C. 154(b) by 538 days.

(21) Appl. No.: 17/844,130

(22) Filed: Jun. 20, 2022

(65) Prior Publication Data

US 2022/0408982 A1 Dec. 29, 2022

Related U.S. Application Data

(60) Provisional application No. 63/214,981, filed on Jun. 25, 2021.

(51) Int. Cl.

| | |
|---|---|
| ***A47K 5/12*** | (2006.01) |
| ***G08B 21/02*** | (2006.01) |
| ***G08B 21/24*** | (2006.01) |
| *A47K 10/38* | (2006.01) |

(52) U.S. Cl.

CPC ........ *A47K 5/1217* (2013.01); *G08B 21/0277* (2013.01); *G08B 21/245* (2013.01); *A47K 2010/389* (2013.01)

(58) Field of Classification Search

CPC .............. G08B 21/245; G08B 21/0277; A47K 5/1217; A47K 2010/389

See application file for complete search history.

(56) References Cited

U.S. PATENT DOCUMENTS

| | | | | |
|---|---|---|---|---|
| 8,648,724 | B2 | 2/2014 | Forsberg et al. | |
| 9,613,518 | B2 | 4/2017 | Dunn et al. | |
| 9,659,481 | B2 | 5/2017 | Himmelmann et al. | |
| 9,830,565 | B2 | 11/2017 | Otoole | |
| 9,892,372 | B2 | 2/2018 | Himmelmann et al. | |
| 10,057,709 | B2 | 8/2018 | Wegelin et al. | |
| 10,130,221 | B2 * | 11/2018 | Borke | A47K 10/36 |
| 10,332,382 | B2 * | 6/2019 | Thyroff | G08B 21/245 |
| 10,529,219 | B2 | 1/2020 | Herdt et al. | |
| 10,973,377 | B2 * | 4/2021 | Stråhlin | A47K 10/32 |
| 11,017,654 | B2 * | 5/2021 | Trapani | G08B 21/245 |
| 11,403,888 | B2 | 8/2022 | Bullock | |
| 2013/0240554 | A1 | 9/2013 | Strahlin | |
| 2015/0022361 | A1 * | 1/2015 | Gaisser | H01L 27/14627 340/573.1 |
| 2018/0047277 | A1 * | 2/2018 | Thyroff | G08B 21/24 |
| 2021/0150825 | A1 * | 5/2021 | Stern | G06N 20/00 |
| 2023/0121230 | A1 * | 4/2023 | Trapani | G06V 40/28 340/573.1 |

* cited by examiner

*Primary Examiner* — Frederick C Nicolas

(57) ABSTRACT

Examples of systems and methods to encourage compliance with hand hygiene recommendations are disclosed. A request for a cleansing agent in a cleansing agent dispenser can be received. A compliance timer can be created upon receiving the request. A subsequent request for a towel from a towel dispenser can be deemed out of compliance with hand hygiene recommendations if the request was received before expiry of the compliance timer.

19 Claims, 5 Drawing Sheets

DEVICE COMMUNICATION FOR HYGIENE COMPLIANCE

CROSS-REFERENCE TO RELATED APPLICATIONS

This application claims priority to U.S. Provisional Patent Application Ser. No. 63/214,981, filed on Jun. 25, 2021, the entirety of which is incorporated by reference herein.

BACKGROUND

Automated dispensers are utilized in various environments to dispense consumable products, such as paper towels, gels, liquids, gases, aerosols, foams, and other consumables. Automated dispensers can operate in various modes. For example, an automated dispenser can dispense a predetermined or variable quantity of a cleanser, such as hand soap, in response to detecting movement or presence in proximity to the automated dispenser. For example, a user's hand, arm, or body can be detected in proximity to the automated dispenser by a user sensor. The user sensor can be a proximity or motion sensor that provides a proximity signal to a controller. Then, the user can utilize another automated dispenser to dispense a predetermined or variable quantity of a towel from a roll of sheet product to dry the user's hands.

Hygiene can be increasingly important, particularly in restaurant, office, retail, and other public environments. Public health concerns can recommend hand washing standards in certain environments. For example, a public health recommendation can urge that employees in a restaurant environment wash their hands in a washroom environment for a minimum amount of time each time the user enters the washroom. In an office environment, an organization might want to encourage users to adhere to hand hygiene best practices, which could include a recommendation for users to wash their hands according to a recommended set of standards each time the user enters the washroom.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to systems and methods for assessing compliance with hygiene protocols in a washroom environment. Examples of the disclosure can assess compliance by implementing a washroom environment in which automated dispenser systems that dispense consumable products can communicate with each other and with other devices. Automated dispenser systems can be used in various settings to dispense consumable products such as sheet product, paper towels, or tissues. The term "sheet products" is inclusive of natural and/or synthetic cloth or paper sheets. Further, sheet products can include both woven and non-woven articles. Examples of sheet products include, but are not limited to, wipers, napkins, tissues, and towels. Automated dispenser systems can also dispense cleansing agents, such as soap or sanitizer in liquid, foam, gel, aerosol, or other forms.

Examples of the disclosure can detect the dispensing of a cleansing agent by the user, the use of a sink faucet, and/or the dispensing of an amount of towel from a towel dispenser to determine whether hygiene recommendations are being followed by users in the washroom. Compliance with hygiene recommendations can be logged in a data store that is in communication with the dispensers in the washroom environments. In one embodiment, the data store can be located within or near the washroom environment, such as within the building or facility in which the washroom is located. In other examples, the data store can be located remotely from the washroom and accessible by a network, such as the internet. Aggregate metrics can also be calculated that illustrate the degree to which hand hygiene recommendations are being followed.

Figure 1:
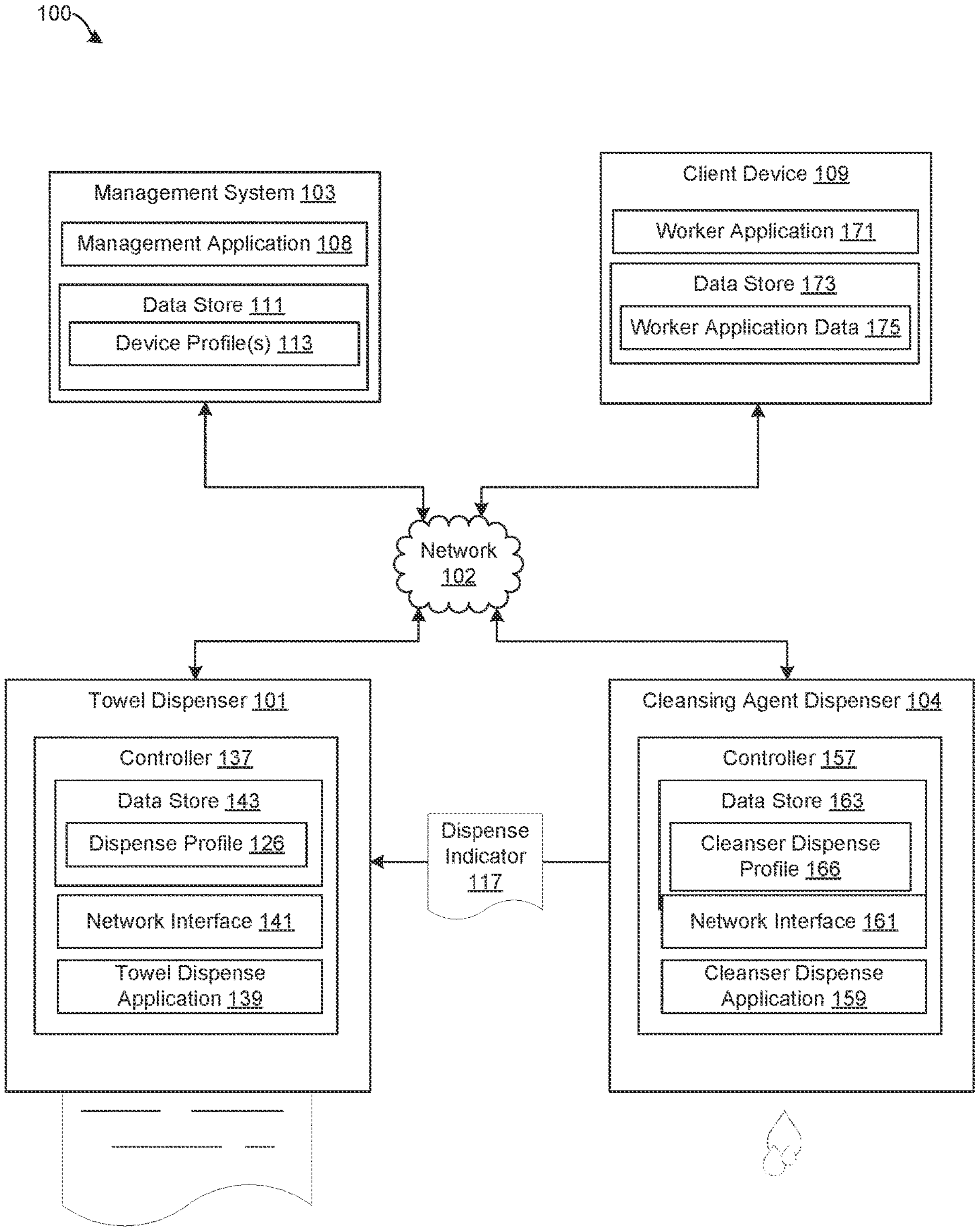
FIG. 1 is a drawing of an example environment according to embodiments of the disclosure.

Referring next to FIG. 1, shown is an example environment 100 in which a towel dispenser 101 can be deployed. The environment 100 can include one or more towel dispenser 101, cleansing agent dispenser 104, management system 103, client device 109, and potentially other devices that are connected to a network 102. The towel dispenser 101 shown in FIG. 1 can represent a population of many towel dispensers 101 that are deployed in various facilities. The towel dispenser 101 can communicate with the management system 103 to obtain configuration and software updates. The towel dispenser 101 can also communicate with the management system 103 to send status information, such as the amount of sheet product that remains in the towel dispenser 101, error codes, battery status, and other status information.

Similarly, the cleansing agent dispenser 104 shown in FIG. 1 can represent a population of many cleansing agent dispensers 104 that are deployed in one or more facilities. The cleansing agent dispenser 104 can also communicate with the management system 103 to obtain configuration and software updates. Like the towel dispenser 101, the cleansing agent dispenser 104 can also communicate with the management system 103 to send status information, such as the amount of cleansing agent remaining in a cleansing agent dispenser 104, battery status, error codes, and other status information. In some implementations, the cleansing agent dispenser 104 can be linked or paired with one or more towel dispenser 101 that are in the same washroom to facilitate the monitoring of hand hygiene compliance. A cleansing agent dispenser 104 can be linked or paired with a towel dispenser 101 in the sense that they communicate with one another within a washroom environment.

The management system 103 can manage one or more towel dispensers 101 and/or cleansing agent dispensers 104 that are deployed in various facilities or buildings. In some implementations, the management system 103 can be located at a facility in which a towel dispenser 101 or cleansing agent dispenser 104 are installed. In this scenario, the locally installed management system 103 can communicate with another management system 103 that is located remotely from the facility. In this configuration, a locally installed management system 103 can act as a local management agent on behalf of a backend management system 103 that is remotely located from the facility.

The network 102 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network and be positioned on the same local network as the towel dispenser 101 and cleansing agent dispenser 104. In other embodiments, the management system 103 can be remote from the towel dispenser 101 and cleansing agent dispenser 104. The management system 103 can also include or be operated as one or more virtualized computer instances. For purposes of convenience, the management system 103 is referred to herein in the singular. Even though the management system 103 is referred to in the singular, a plurality of management systems 103 can be employed in various arrangements.

The components executed on the management system 103 can include a management application 108 as well as other applications, services, processes, systems, engines, or functionality not discussed in detail herein. The management application 108 can represent an application or service that can remotely manage one or more towel dispensers 101 or cleansing agent dispensers 104.

The data store 111 can include any storage device or medium that can contain, store, or maintain data in connection with the management application 108. The data store 111 can be a hard drive or disk of a host, server computer, or any other system providing storage capability. While referred to in the singular, the data store 111 can include a plurality of storage devices that are arranged in one or more hosts, server banks, computer banks, or other arrangements. The data store 111 can include any one of many physical media, such as magnetic, optical, or semiconductor media. More specific examples include solid-state drives or flash memory.

The data stored in the data store 111 can include one or more device profiles 113. A device profile 113 can store information about an automated dispenser system, such as a towel dispenser 101 or a cleansing agent dispenser 104 that is managed by the management application 108. The device profile 113 can include a device identifier for a managed device, device status information, a facility or location identifier for the device, a room identifier in which a managed device is installed, and other information that facilitates management of a towel dispenser 101 or cleansing agent dispenser 104.

In some embodiments, the device profile 113 can also include an identifier for another automated dispenser system that is paired with a managed device. For example, a cleansing agent dispenser 104 can be paired with a towel dispenser 101 to encourage hand hygiene compliance. Once a cleansing agent dispenser 104 dispenses an amount of cleansing agent, the cleansing agent dispenser 104 can alert the management application 108 or a paired towel dispenser 101, which can automatically dispense a portion of a towel after a compliance time period. A compliance time period can be associated with a device profile 113 or as a setting that is configurable per facility or washroom. A compliance time period can be an amount of time that a user of a washroom is expected to wash his or her hands to comply with hygiene recommendations or requirements. The compliance time period can be the time period after a cleansing agent is dispensed by a cleansing agent dispenser 104 that the user is expected to wash his or her hands.

In some examples, a faucet can also be a device that is managed by the management application 108, and the compliance time period can be measured once the faucet associated with a sink is activated and after cleansing agent is dispensed by the cleansing agent dispenser 104. The time between dispensing of cleansing agent and dispensing of a towel from the towel dispenser 101 can be tracked by the management application 108 to determine whether users are washing their hands when using the washroom according to hygiene guidelines or standards. In some implementations, the time that is tracked is the time that the sink faucet is on after dispensing of a cleansing agent from the cleansing agent dispenser 104.

A towel dispenser 101 can represent a sheet product dispenser that can dispense a consumable product, such as sheet product, paper towels or tissues, in response to an input from one or more sensor inputs or other criteria. The towel dispenser 101 can include a product supply, such as one or more rolls of a sheet product (e.g., tissue or paper towel). The towel dispenser 101 can also include a feed mechanism that can extract a portion of the sheet product from the product supply. The towel dispenser 101 can include a user sensor, such as a motion or proximity sensor, that a user can activate to dispense a portion of the sheet product. The motion or proximity sensor can provide a motion or proximity signal that indicates that a user has requested a portion of a towel from the towel dispenser 101.

The towel dispenser 101 can also include a controller 137 that can execute a towel dispense application 139. The towel dispense application 139 represents software or firmware executed by the controller 137 to facilitate hand hygiene compliance according to examples of the disclosure. The controller 137 can represent a processor-based instruction execution system or computing device that can be equipped with memory, input/output interfaces, a network interface 141, a data store 143, and potentially other computing resources. The controller 137 can be a general-purpose computing device or subsystem of the towel dispenser 101 or a special purpose computing device that is integrated into the towel dispenser 101. In some implementations, the controller 137 can be in an external housing or located remotely from the towel dispenser 101.

The network interface 141 represents a network capability of the controller 137 that allows the controller 137 to communicate with the network 102 and the management system 103. The network interface 141 can also include a personal area network (PAN) interface, such as a Bluetooth and/or Bluetooth low energy (BLE) interface that allows the towel dispenser 101 to communicate with devices that are in proximity to the towel dispenser 101. For example, the network interface 141 can enable the towel dispenser 101 to communicate with a cleansing agent dispenser 104 in a washroom environment to receive a dispense indicator 117 that indicates that the cleansing agent dispenser 104 has dispensed cleansing agent to a user.

The towel dispenser 101 can broadcast a BLE advertisement that another device in the washroom environment, such as a cleansing agent dispenser 104, a hub or a locally installed management system 103, can retrieve to determine that the towel dispenser 101 has dispensed a towel portion. The towel dispenser 101 can also transmit an event indicating dispensing of a portion of a towel to the management application 108 over the network 102. The indication can include a timestamp so that the event can be assessed for compliance with hygiene standards or recommendations.

The data store 143 can include any storage device or medium that can contain, store, or maintain the instructions, logic, or applications described herein for use by or in connection with the instruction execution system. The data store 143 can be flash storage, memory, a hard drive or disk of the controller 137, or any other system providing storage capability.

The data stored in the data store 143 can be associated with the operation of the various applications and/or functional entities described. The data stored in the data store 143 can comprise a dispense profile 126 obtained from the management application 108. In some examples, the dispense profile 126 can be stored in the data store 143 at the time of manufacture of the towel dispenser 101. In other examples, the dispense profile 126 can be loaded into the data store 143 using a local communication interface. A dispense profile 126 can specify the behavior of the towel dispenser 101 in operation.

A dispense profile 126 can specify a mode of operation for the towel dispenser 101, the speed with which consumable product is dispensed, and other aspects of how the towel dispenser 101 behaves in operation. Additionally, the dispense profile 126 can facilitate compliance with hand hygiene recommendations. For example, the dispense profile 126 can specify a cleansing agent dispenser 104 with which the towel dispenser 101 is paired. The dispense profile 126 can include a device identifier of the cleansing agent dispenser 104 with which the towel dispenser 101 is paired. Additionally, the dispense profile 126 can specify that upon receiving an indication that a paired cleansing agent dispenser 104 has dispensed cleansing agent, that the towel dispenser 101 should dispense a portion of sheet product after a compliance time period. Again, a compliance time is a recommended amount of time that the user is expected to wash his or her hands according to hand hygiene recommendations. The compliance time period can represent a delay during which the user is not permitted to dispense a towel from the towel dispenser 101 in some embodiments. In other words, the towel dispenser 101 can withhold dispensing a portion of a towel during the compliance time period after an indication that the cleansing agent dispenser 104 has dispensed cleansing agent, which can encourage the user to wash his or her hands for a recommended amount of time.

In some embodiments, the towel dispenser 101 can dispense a towel to a user who requests one before expiration of the compliance time period and transmit an indication that the towel dispenser 101 has dispensed a towel before expiration of the compliance time period. In other words, the request can be deemed out of compliance with hand hygiene recommendations. The management application 108 can log the instance or update an aggregated or anonymous metric regarding compliance with hand hygiene recommendations for a particular time period. The metric can express a percentage of users to the washroom who follow hand hygiene recommendations or best practices. The metric can also be calculated on a facility-by-facility basis. In this scenario, the management application 108 can calculated an aggregated metric based upon multiple washrooms in a particular facility. The aggregated metric can express a percentage of users of washrooms in the facility who follow hand hygiene recommendations or best practices.

The towel dispense application 139 can oversee the operation of the towel dispenser 101 to implement a dispense profile 126. The towel dispense application 139 also obtain additional and/or updated dispense profiles 126 from the management application 108 that are provided to the towel dispenser 101 over the network 102. A dispense profile 126 can be given an “over-the-air” (OTA) update from time to time. Additionally, the towel dispense application 139 itself can be updated from time to time by the management application 108. It is not required that a towel dispenser 101 be remotely managed by the management application 108 in all implementations. Additionally, a dispense profile 126 can be stored on a towel dispenser 101 for execution by the towel dispense application 139 at the time of manufacture.

The towel dispense application 139 can cause the towel dispenser 101 to periodically send advertisement messages, such as a BLE advertisement message, that indicates the status of product levels within the towel dispenser 101. The towel dispense application 139 can determine product levels, such as the amount of sheet product remaining in the towel dispenser 101, by relying upon data from sensors within the towel dispenser 101. The advertisement messages can indicate whether a product source, such as one or more rolls of sheet product, requires replenishment. The advertisement messages can also be sent via the network 102 to the management application 108, which can update a management portal with information about the product levels within the towel dispenser 101.

A cleansing agent dispenser 104 can represent an automated dispenser system that can dispense a consumable product, such as soap, sanitizer, or another cleansing agent in response to an input from one or more sensor inputs or other criteria. The cleansing agent dispenser 104 can include a product supply, such as one or more bladders or other containers of a liquid, gel, aerosol, or other cleansing agent. The cleansing agent can be used by a user to wash his or her hands in a washroom, kitchen, lab, or other environment in which a cleansing agent is desired. The cleansing agent dispenser 104 can include a user sensor, such as a motion or proximity sensor, that a user can activate to dispense a portion of the sheet product.

The cleansing agent dispenser 104 can also include a controller 157 that can execute a cleanser dispense application 159. The controller 157 can represent a processor-based instruction execution system or computing device that can be equipped with memory, input/output interfaces, a network interface 161, a data store 163, and potentially other computing resources. The controller 157 can be a general-purpose computing device or subsystem of the cleansing agent dispenser 104 or a special purpose computing device that is integrated into the cleansing agent dispenser 104. In some implementations, the controller 157 can be in an external housing or located remotely from the cleansing agent dispenser 104.

The network interface 161 represents a network capability of the controller 157 that allows the controller 157 to communicate with the network 102 and the management system 103. The network interface 161 can also include a personal area network (PAN) interface, such as a Bluetooth and/or Bluetooth low energy (BLE) interface that allows the cleansing agent dispenser 104 to communicate with devices that are in proximity to the cleansing agent dispenser 104.

For example, the network interface 161 can enable the cleansing agent dispenser 104 to communicate with a towel dispenser 101 to transmit an indication that the cleansing agent dispenser 104 has dispensed cleansing agent to a user of the washroom. The cleansing agent dispenser 104 can broadcast a BLE advertisement that the towel dispenser 101 can retrieve to determine that the cleansing agent dispenser 104 has dispensed cleansing agent. The cleansing agent dispenser 104 can also transmit an event indicating dispensing of a cleansing agent to the management application 108. The indication can include a timestamp so that the event can be assessed for compliance with hygiene standards or recommendations.

The data store 163 can include any storage device or medium that can contain, store, or maintain the instructions, logic, or applications described herein for use by or in connection with the instruction execution system. The data store 163 can be flash storage, memory, a hard drive or disk of the controller 157, or any other system providing storage capability.

The data stored in the data store 163 can be associated with the operation of the cleansing agent dispenser 104. The data stored in the data store 163 can comprise a cleanser dispense profile 166 obtained from the management application 108. In some examples, the cleanser dispense profile 166 can be stored in the data store 163 at the time of manufacture of the cleansing agent dispenser 104. In other examples, the cleanser dispense profile 166 can be loaded into the data store 163 using a local communication interface. A cleanser dispense profile 166 can specify the behavior of the cleansing agent dispenser 104 in operation.

A cleanser dispense profile 166 can specify a mode of operation for the cleansing agent dispenser 104, the speed with which consumable product is dispensed, and other aspects of how the cleansing agent dispenser 104 behaves in operation. Additionally, the cleanser dispense profile 166 can facilitate compliance with hand hygiene recommendations. For example, the cleanser dispense profile 166 can specify a towel dispenser 101 with which the cleansing agent dispenser 104 is paired. The cleanser dispense profile 166 can include a device identifier of the towel dispenser 101 with which the cleansing agent dispenser 104 is paired. Additionally, the cleanser dispense profile 166 can specify that that cleansing agent dispenser 104 should transmit an indication it has dispensed cleansing agent to a paired towel dispenser 101.

The cleanser dispense application 159 can oversee the operation of the cleansing agent dispenser 104 to implement a cleanser dispense profile 166. The cleanser dispense application 159 also obtain additional and/or updated cleanser dispense profiles 166 from the management application 108 that are provided to the cleansing agent dispenser 104 over the network 102. A cleanser dispense profile 166 can be given an "over-the-air" (OTA) update from time to time. Additionally, the cleanser dispense application 159 itself can be updated from time to time by the management application 108. It is not required that a cleansing agent dispenser 104 be remotely managed by the management application 108 in all implementations. Additionally, a cleanser dispense profile 166 can be stored on a cleansing agent dispenser 104 for execution by the cleanser dispense application 159 at the time of manufacture.

The cleanser dispense application 159 can cause the cleansing agent dispenser 104 to periodically send advertisement messages, such as a BLE advertisement message, that indicates the status of product levels within the cleansing agent dispenser 104. The cleanser dispense application 159 can determine product levels, such as the amount of cleansing agent remaining in the cleansing agent dispenser 104, by relying upon data from sensors within the cleansing agent dispenser 104. The advertisement messages can indicate whether the cleansing agent requires replenishment. The advertisement messages can also be sent via the network 102 to the management application 108, which can update a management portal with information about the product levels within the cleansing agent dispenser 104.

The client device 109 can represent a device that can be utilized by a worker in a facility that is tasked with cleaning or maintenance of a washroom in which one or more towel dispenser 101 or cleansing agent dispenser 104 are installed. The client device 109 can represent a smartphone or mobile device that is executing a worker application 171. The client device 109 can communicate with the management application 108 over the network 102. The client device 109 can also be equipped with a network interface that allows for communication with a towel dispenser 101 or cleansing agent dispenser 104 over a Bluetooth, BLE, or other personal area network connection. In some embodiments, the towel dispenser 101 and cleansing agent dispenser 104 can be equipped with a WiFi network interface that provides for communication with the client device 109 over the network 102.

The data store 173 can include any storage device or medium that can contain, store, or maintain the instructions, logic, or applications described herein for use by or in connection with the instruction execution system. The data store 173 can be flash storage, memory, a hard drive or disk of the client device 109, or any other system providing storage capability.

The data stored in the data store 173 can be associated with the operation of the client device 109 and the data store 173. The data stored in the data store 173 can comprise worker application data 175. Worker application data 175 can include data that is obtained from the management application 108 about maintenance tasks assigned to a worker. The worker application data 175 can also include information about one or more towel dispenser 101 and cleansing agent dispenser 104 that are obtained from dispensers through BLE advertisements sent by the devices or using other messaging protocols through which dispensers can communicate with a client device 109 that is in proximity to a washroom environment.

The worker application 171 is an application that can aid personnel tasked with cleaning and maintaining washroom environments in a facility. The worker application 171 can communicate with the management application 108 to obtain a list of washrooms or dispensers within a facility that require attention. A dispenser, such as a towel dispenser 101 or cleansing agent dispenser 104 can provide information to the management application 108 about the amount of consumable product that remains in the dispensers. Accordingly, once product levels drops below a threshold level, the management application 108 can add the dispensers to a work queue so that a worker can refill the dispensers.

In some embodiments, the worker application 171 can communicate directly with dispensers in a facility by consuming BLE advertisements that are sent by the dispensers. The BLE advertisements can include a device identifier that uniquely identifies a dispenser with respect to others in the facility. The BLE advertisements can also include a bit or field that expresses whether the dispenser has sufficient consumable product or requires refilling. The dispenser can make such a determination by assessing whether the level of consumable product, based upon sensor data received from product level sensors, is at or below a threshold level.

The worker application 171 can generate a user interface that displays a task queue for a worker. The task queue can be generated by the management application 108 by determining which washrooms and/or dispensers within a facility require attention. Washrooms can be scheduled for cleaning and maintenance according to a schedule based on how much use the washrooms receive in a given time period. For example, some washrooms might require cleaning and restocking multiple times per day in high traffic environments.

The worker application 171 can also obtain information about washrooms or dispensers directly from dispensers by way of advertisement messages. The advertisement messages can provide information about product levels or operating condition, and the worker application 171 can update a user interface that shows a queue of washrooms or dispensers to service by showing the information received in the advertisement messages for nearby dispensers.

In one embodiment, the worker application 171 can display a list of dispensers sorted by proximity to the client device 109. Proximity to the client device 109 can be determined based upon a signal strength of advertisement messages received from the dispensers. Dispensers for which advertisement messages have the highest signal strength can be assumed to be closer to the client device 109 than dispensers associated with a weaker signal strength. The worker application 171 can add dispensers to a work queue of a worker that provide an advertisement message that indicates that the respective dispenser requires refilling. Additionally, a worker can also proactively refill a dispenser that indicates that it is near a replenishment threshold. In one example, the worker application 171 can calculate an estimated time remaining for product in a dispenser based upon how much product that remains in a dispenser as reported in an advertisement message. The estimated time remaining for product in a dispenser can be displayed in a user interface generated by the worker application 171.

In some examples, a towel dispenser 101 or cleansing agent dispenser 104 can report a status update to the management application 108 when they are replenished by a worker. The management application 108 can credit a worker nearest the towel dispenser 101 or cleansing agent dispenser 104 with refilling or servicing the dispenser. The management application 108 can identify the worker nearest the dispenser by identifying a client device 109 reporting the highest received signal strength indicator (RSSI).

Figure 2:
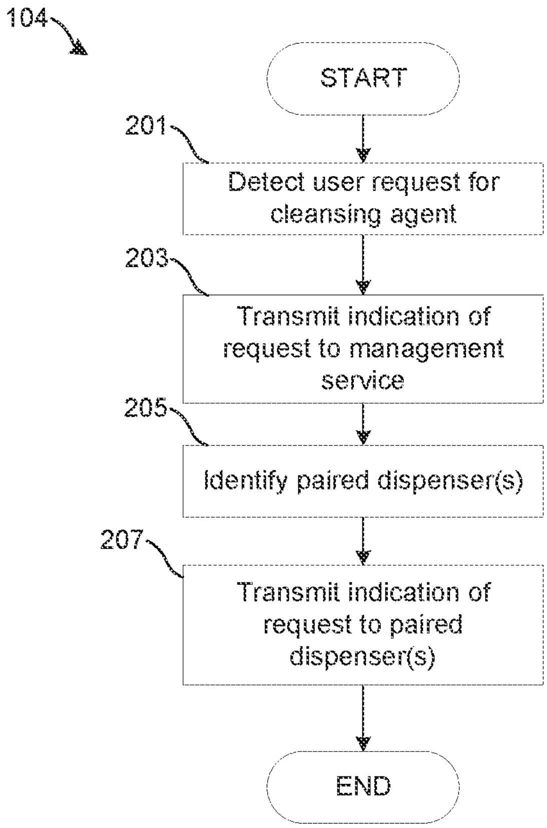
FIG. 2 is an example of a flowchart according to embodiments of the disclosure.

Reference is made to FIG. 2, which illustrates a flowchart illustrating a process according to examples of the disclosure. The flowchart of FIG. 2 illustrates an example of a method that can be implemented by the cleansing agent dispenser 104. The process shown can be implemented as an application executed by the controller 157.

First, at step 201, the controller 157 can detect a request to dispense a portion of cleansing agent in the cleansing agent dispenser 104. The request can be generated when a user activates a motion sensor, proximity sensor, button, lever, or another sensor of the cleansing agent dispenser 104 that is used to dispense cleansing agent from the cleansing agent dispenser 104.

At step 203, the controller 157 can transmit an indication or alert that a user has requested cleansing agent from the cleansing agent dispenser 104. The indication can be transmitted over the network 102 to the management application 108. The indication can include a timestamp and a device identifier of the cleansing agent dispenser 104. In some examples, the indication can also include an identifier for a washroom or facility in which the cleansing agent dispenser 104 is installed. The management application 108 can log the indication to determine whether hand hygiene compliance is followed based on subsequent data from a sink faucet or towel dispenser 101.

At step 205, the controller 157 can identify one or more paired devices, such as one or more towel dispenser 101. The controller 157 can identify the paired devices by analyzing a cleanser dispense profile 166 associated with the cleansing agent dispenser 104, which can specify one or more towel dispenser 101, sink faucets, or other devices with which the cleansing agent dispenser 104 is paired. The cleanser dispense profile 166 can also identify how to communicate with the paired devices.

In some implementations, the controller 157 can also send a BLE advertisement without regard for paired devices. In this scenario, the BLE advertisement can be received by any device that is in the vicinity of the cleansing agent dispenser 104.

At step 207, the controller 157 can transmit an indication or alert that a user has requested cleansing agent from the cleansing agent dispenser 104. The indication can be transmitted over a personal area connection or local area connection to paired devices, such as one or more towel dispenser 101 in the washroom. The indication can be sent as a BLE advertisement message. The indication can include a timestamp and a device identifier of the cleansing agent dispenser 104. Thereafter, the process can proceed to completion.

Figure 3:
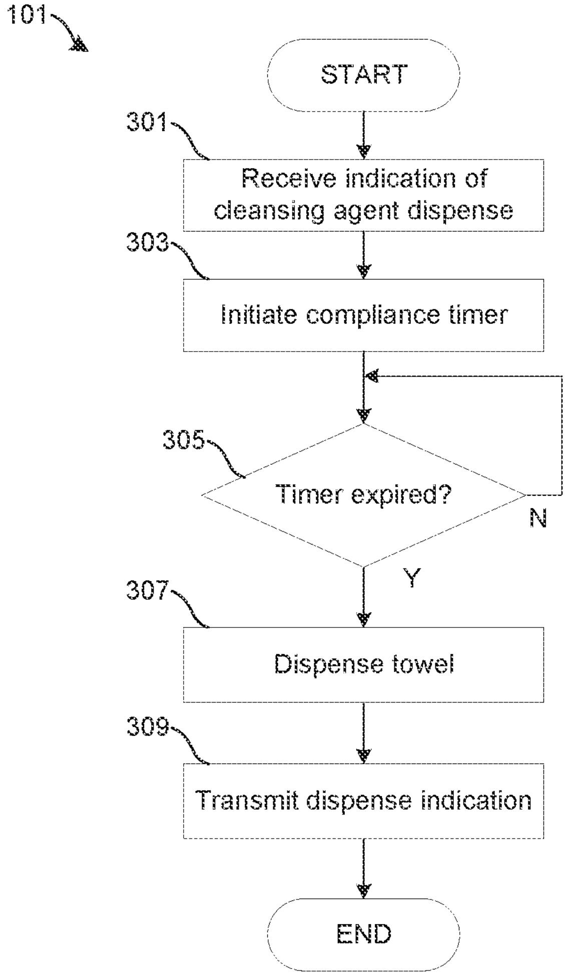
FIG. 3 is an example of a flowchart according to embodiments of the disclosure.

Reference is made to FIG. 3, which illustrates a flowchart illustrating a process according to examples of the disclosure. The flowchart of FIG. 3 illustrates an example of a method that can be implemented by the towel dispenser 101. The process shown can be implemented as an application executed by the controller 137.

First, at step 301, the controller 137 can receive an indication that a user has requested cleansing agent from a nearby cleansing agent dispenser 104. The indication can be received as a Bluetooth or BLE advertisement message. The indication can include a device identifier associated with the cleansing agent dispenser 104 from which the indication originated.

At step 303, upon receiving the indication in step 301, the controller 137 of the towel dispenser 101 can initiate a compliance timer. The compliance timer can be specified by a dispense profile 126. The compliance timer can represent a time period after which the towel dispenser 101 can automatically dispense a towel to the user. The compliance timer can represent a minimum recommended amount of time for handwashing. In some examples, the compliance timer can be started after the indication is received from the cleansing agent dispenser 104 and also after an indication is received from a faucet that is turned on in the washroom.

At step 305, the controller 137 can wait for the compliance timer to expire. For example, if the compliance timer is twenty seconds, the controller 137 can set a countdown timer for twenty seconds and await its expiry.

At step 307, after expiry of the compliance timer, the controller 137 can cause the towel dispenser 101 to automatically dispense a towel from a product source of the towel dispenser 101. The towel can comprise a portion of sheet product that the user can tear or remove from the towel dispenser 101.

At step 309, the controller 137 can transmit an indication that a towel has been dispensed from the towel dispenser 101 to the management application 108. The indication can be logged by the management application 108 for compliance purposes so that hand hygiene compliance metrics can be stored and/or calculated, if desired. Thereafter, the process can proceed to completion.

Figure 4:
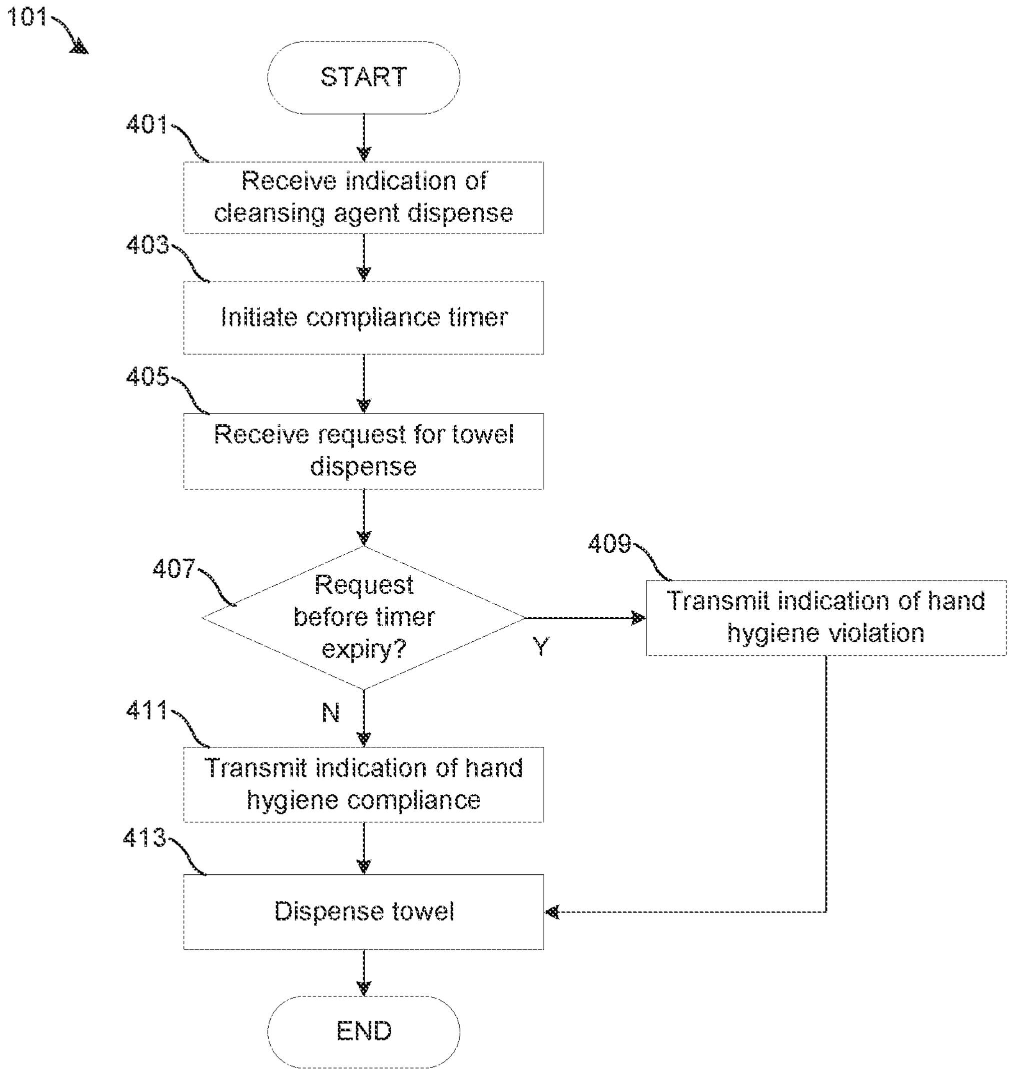
FIG. 4 is an example of a flowchart according to embodiments of the disclosure.

Reference is made to FIG. 4, which illustrates a flowchart illustrating a process according to examples of the disclosure. The flowchart of FIG. 4 illustrates an example of a method that can be implemented by the towel dispenser 101. The process shown can be implemented as an application executed by the controller 137.

First, at step 401, the controller 137 can receive an indication that a user has requested cleansing agent from a nearby cleansing agent dispenser 104. The indication can be received as a Bluetooth or BLE advertisement message. The indication can include a device identifier associated with the cleansing agent dispenser 104 from which the indication originated.

At step 403, upon receiving the indication in step 401, the controller 137 of the towel dispenser 101 can initiate a compliance timer. The compliance timer can be specified by a dispense profile 126. In the example of FIG. 4, the compliance timer can represent an amount of time for which the user is expected to wash his or her hands after dispensing cleansing agent. Should the user wash his or her hands for the compliance timer, the user is considered to be in compliance with hand hygiene recommendations. Should the user fail to wash his or her hands for the compliance timer, the user is not considered to be in compliance with hand hygiene recommendations.

At step 405, the controller 137 can receive a request to dispense a towel on behalf of a user. The request can be generated in response to the user triggering a sensor after which the towel dispenser 101 can automatically dispense a towel to the user. The compliance timer can represent a recommended amount of time for handwashing according to hand hygiene recommendations or best practices. In some examples, the compliance timer can be started after the indication is received from the cleansing agent dispenser 104 and/or after an indication is received from a faucet that is turned on in the washroom.

At step 407, the controller 137 can determine whether the request to dispense a towel was received before expiry of the compliance timer. If the request was received before expiry of the compliance timer, the process can proceed to step 409. If the request was received on or after expiry of the compliance timer, the process can proceed to step 411.

At step 409, the controller 137 can transmit an indication of a hand hygiene violation to the management application 108 which can log the violation as well as calculate or update metrics on hand hygiene compliance. The management application 108 can maintain metrics on hand hygiene compliance on a washroom or facility basis. The metrics can express how well a washroom or facility is performing with respect to hand hygiene compliance. For example, a metric can include a percentage of visitors to the washroom who request a cleansing agent that also wash their hands for a minimum recommended amount of time as expressed by the compliance timer length. In some embodiments, the controller 137 can ignore the request to dispense the towel received at step 407 if the request was received before expiry of the compliance timer. In this scenario, the controller can wait until expiry of the compliance time before dispensing a towel even if a user requests to dispense the towel. In other embodiments, the controller 137 can cause the towel dispenser 101 to dispense the towel prior to expiry of the compliance timer and log the event as out of compliance with hand hygiene recommendations.

At step 411, if the request for a towel was received on or after expiry of the compliance timer, the controller 137 can transmit an indication of hand hygiene compliance to the management application 108, which can log the instance as well as update any metrics regarding hand hygiene compliance. At step 411, because the request was received on or after expiry of the compliance timer, the indication can express that the usage of the washroom associated with the request was in compliance with hand hygiene recommendations.

In some embodiments, the controller 137 can also transmit an indication that usage of the washroom was not in compliance with hand hygiene recommendations if a request to dispense a towel is received that does not follow an indication that cleansing agent was dispensed from the cleansing agent dispenser 104. In this scenario, the user may have only rinsed his or her hands without using the cleansing agent, which an represent a violation of hand hygiene recommendations.

At step 413, the towel dispenser 101 can dispense a towel. The controller 137 can cause a motor or dispenser mechanism to dispense a portion of a sheet product in the towel dispenser 101 to be presented to the user. The user can then tear or remove a portion of the sheet product from the towel dispenser 101. Thereafter, the process can proceed to completion.

Figure 5:
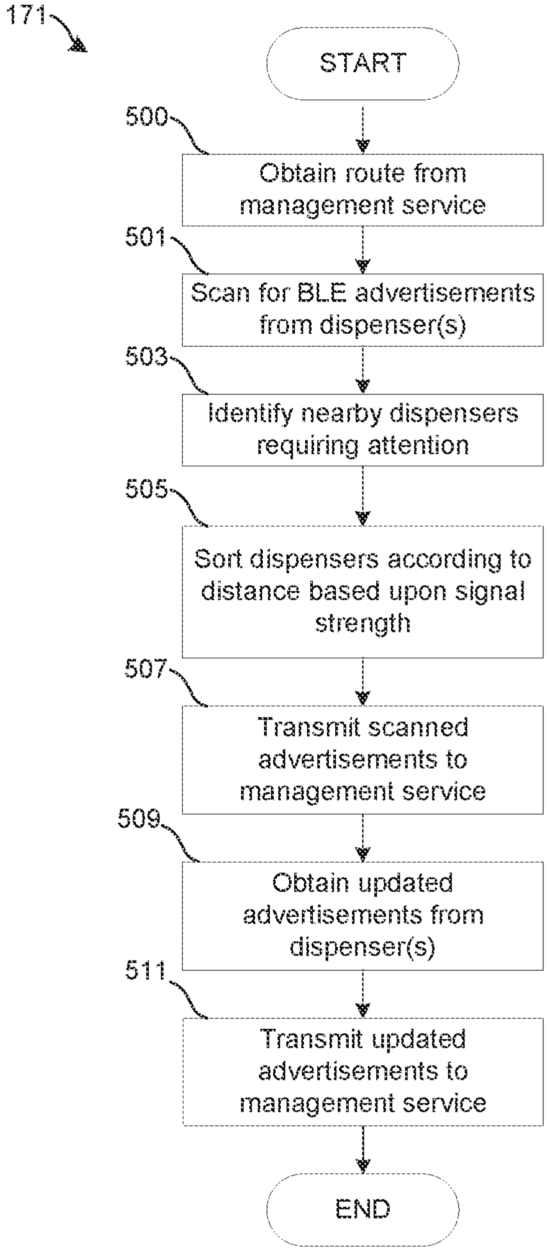
FIG. 5 is an example of a flowchart according to embodiments of the disclosure.

Reference is made to FIG. 5, which illustrates a flowchart illustrating a process according to examples of the disclosure. The flowchart of FIG. 5 illustrates an example of a method that can be implemented by worker application 171. The process shown can be implemented as an application executed by the client device 109.

First, at step 500, the worker application 171 can obtain a maintenance route from the management application 108. The maintenance route obtained by the worker application 171 can represent a work queue for a worker assigned to the client device 109. The route instructs the worker which washrooms in a facility to service and potentially the order in which washrooms should be serviced. The route can vary by time of day, seasonally, or based upon other factors.

At step 501, as the client device 109 proceeds along the assigned route, the worker application 171 can scan for BLE advertisement messages from dispensers, such as a towel dispenser 101 or cleansing agent dispenser 104. The BLE advertisement messages can be periodically broadcast by a towel dispenser 101 or cleansing agent dispenser 104 and include device status information, such as a device identifier and information about how much consumable product remains in the dispenser. For example, the advertisement messages can include a Boolean value that specifies whether the dispenser requires servicing or refilling. The advertisement messages can also include a numerical value that represents an amount of consumable product remaining in the dispenser.

A step 503, the worker application 171 can identify nearby dispensers requiring attention based on the advertisement messages obtained at step 501. The worker application 171 can identify dispensers requiring servicing or refilling based upon the data contained with the advertisement messages. If a towel dispenser 101 or cleansing agent dispenser 104 broadcasts an advertisement message that indicates that the dispenser requires refilling, the worker application 171 can display an indication in a user interface presented to the user of the worker application 171.

At step 505, the worker application 171 can sort the dispensers based upon the distance from the client device 109 based upon the RSSI of the advertisement messages that are obtained in step 501. The worker application 171 can display a user interface element that shows a list, map, graph, or other visual element showing the dispensers. The worker application 171 can also utilize a map of a facility that is obtained from the management application 108 or otherwise accessible to the worker application 171 and show the nearby dispensers on a map user interface.

At step 507, the worker application 171 can transmit the scanned BLE advertisement messages, or the data represented in the advertisement messages, to the management application 108. Because the worker application 171 can obtain BLE advertisements directly from a respective towel dispenser 101 or cleansing agent dispenser 104, the status of dispensers can be updated in real-time as opposed to obtaining the status of dispensers from the management application 108. The advertisements sent to the management application 108 can be accompanied by a RSSI observed by the worker application 171 that scanned the BLE advertisement.

At step 509, the worker application 171 can determine whether there are updated BLE advertisements received from dispensers. In one scenario, a worker can service or refill one or more towel dispenser 101 or cleansing agent dispenser 104. Accordingly, an updated BLE advertisement can be broadcast from the dispenser that was serviced.

At step 511, the worker application 171 can transmit updated BLE advertisements received from dispensers to the management application 108. In one example, the management application 108 can credit a worker associated with a particular client device 109 with servicing the dispenser. In another example, the dispensers can report their updated statuses directly to the management application 108, and the management application 108 can identify which client device 109 was nearest to the dispensers that were serviced based upon RSSI. The management application 108 can then credit a worker associated with the client device 109 with completing servicing of the dispenser. Thereafter, the process can proceed to completion.

In some implementations, the worker application 171 can be utilized to facilitate flexible worker solutions, or “gig workers” in a facility that utilizes one or more client device 109 running the worker application 171. In one example, a facility administrator can publish available routes or jobs for a given facility on a given day. A user can utilize the worker application 171 running on a client device 109 to sign up for a given route in a facility. The worker application 171 can provide the needed instructions for servicing dispensers and/or washrooms on the route to the worker. In some cases, the worker application 171 can facilitate a background check, authentication of the worker, and payment of the worker upon completion of a particular route.

Utilizing the example of FIG. 5 and its variants, the management application 108 can also track completion of a route based upon data provided by the worker application 171 as the worker traverses a given route. In one example, a facility administrator can define a route and assign tasks for the route. The tasks can include cleaning certain areas of a washroom or a facility associated with the washroom, replenishing consumable products, or performing other tasks related to the washroom or facility.

To provide an assigned route to a worker, the worker application 171 can scan an identifier, such as a barcode or quick-response code (QR code), that is provided to the worker by a supervisor. The identifier can comprise a link to the management application 108 and include a unique identifier that specifies a particular route, task, or set of tasks. The management application 108 can in turn identify or generate a route specified by the identifier and provide the route to the worker application 171.

In some examples, the worker application 171 can be used by the worker to capture pictures or other data in addition to advertisement messages from dispensers to show task completion. The data can be captured by a camera, near-field communication (NFC) or radio-frequency identification (RFID) scanner associated with a client device 109. The data can be provided to the management application 108 when a worker marks a particular task as completed. For example, if a worker completes a task displayed by the worker application 171 to service a particular towel dispenser 101, the worker application 171 can prompt the worker to capture an image of the completed task, which can be provided to the management application 108.

In some examples, the worker application 171 can also be utilized by a worker to access secured resources in a facility, such as a supply closet, supply cabinet, or other resources that can be secured by a physical access control system (PACS system). A secured resource can be accessed using a PACS system to secure supplies that are used to service a washroom. Accordingly, the worker application 171 can include a credential that a worker can submit to a PACS reader, which can determine whether the credential grants the worker access to the secured resource, such as a locked supply cabinet or closet. The credential can comprise an identifier that can be presented to a PACS reader by way of a barcode, such as a quick-response (QR) code, or using an NFC or RFID capability of the client device 109.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a “computer-readable medium” can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that measurements, amounts, and other numerical data can be expressed herein in a range format. It is also understood that there are a number of values disclosed herein, and that each value is also herein disclosed as "approximately" that particular value in addition to the value itself. For example, if the value "10" is disclosed, then "approximately 10" is also disclosed. Similarly, when values are expressed as approximations, by use of the antecedent "approximately," it will be understood that the particular value forms a further aspect. For example, if the value "approximately 10" is disclosed, then "10" is also disclosed.

As used herein, the terms "about," "approximately," "at or about," and "substantially equal" can mean that the amount or value in question can be the exact value or a value that provides equivalent results or effects as recited in the claims or taught herein. That is, it is understood that amounts, sizes, measurements, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In general, an amount, size, measurement, parameter or other quantity or characteristic is "about," "approximate," "at or about," or "substantially equal" whether or not expressly stated to be such. It is understood that where "about," "approximately," "at or about," or "substantially equal" is used before a quantitative value, the parameter also includes the specific quantitative value itself, unless specifically stated otherwise.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

Such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.10%; about 5% to about 2.4%; about 0.5% to about 3.2%, and about 0.5% to about 4.4%, and other possible sub-ranges) within the indicated range.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A method, comprising:

identifying a request to dispense a cleansing agent from a cleansing agent dispenser in a washroom environment;

identifying a paired towel dispenser associated with the cleansing agent dispenser; and transmitting, based on the identified request to dispense the cleansing agent, an indication to the paired towel dispenser to cause the paired towel dispenser to dispense a towel.

2. The method of claim 1, wherein the indication of the request to dispense to the paired towel dispenser comprises a Bluetooth advertisement message.

3. The method of claim 1, wherein the method further comprises transmitting the indication of the request to dispense the cleansing agent to a management application over a network and wherein the management application is remotely executed from the cleansing agent dispenser.

4. The method of claim 1, wherein the indication of the request to dispense the cleansing agent comprises an identifier of the cleansing agent dispenser.

5. The method of claim 1, further comprising:

initiating a compliance timer in response to receiving the request to dispense the cleansing agent; and causing the towel to be dispensed by the paired towel dispenser upon expiration of the compliance timer.

6. The method of claim 5, further comprising:

transmitting an indication of a dispensing of the towel by the towel dispenser to a management application.

7. The method of claim 6, further comprising:

calculating a hand hygiene compliance metric based upon the indication of the dispensing of the towel by the towel dispenser.

8. The method of claim 1, further comprising causing the towel to be dispensed by the paired towel dispenser in response to receiving the indication.

9. A method, comprising:

identifying an event corresponding to dispensing of a portion of a cleansing agent from a cleansing agent dispenser in a washroom environment;

determining, in a towel dispenser, a compliance timer associated with the washroom environment;

initiating the compliance timer in response to the event corresponding to dispensing of the portion of the cleansing agent; and determining that a request to dispense a towel from the towel dispenser is out of compliance with a hand hygiene recommendation in response to the request being received before expiration of the compliance timer.

10. The method of claim 9, wherein the event is based upon at least one signal from a proximity sensor or motion sensor associated with the cleansing agent dispenser.

11. The method of claim 9, further comprising causing the towel dispenser to dispense the towel in response to the request.

12. The method of claim 9, further comprising generating an aggregated metric associated with hand hygiene compliance in response to determining that the request to dispense the towel is out of compliance with the hand hygiene recommendation.

13. The method of claim 12, wherein the aggregated metric corresponds to a facility in which the cleansing agent dispenser is located.

14. The method of claim 9, further comprising causing the towel dispenser to dispense the towel.

15. A method, comprising:

identifying an event corresponding to dispensing of a portion of a cleansing agent from a cleansing agent dispenser in a washroom environment;

determining, in a towel dispenser, a compliance timer associated with the washroom environment;

initiating the compliance timer in response to the event corresponding to dispensing of the portion of the cleansing agent; and upon expiration of the compliance timer, automatically causing the towel dispenser to dispense a portion of a towel.

16. The method of claim 15, comprising:

obtaining a request to dispense a towel from the towel dispenser prior to expiration of the compliance timer, and determining that the request to dispense the towel is out of compliance with a hand hygiene recommendation in response to the request being received before expiration of the compliance timer.

17. The method of claim 16, further comprising ignoring the request and causing the towel dispenser to dispense the towel upon expiration of the compliance timer.

18. The method of claim 16, further comprising generating an aggregated metric associated with hand hygiene compliance in response to determining that the request to dispense the towel is out of compliance with the hand hygiene recommendation.

19. The method of claim 16, wherein obtaining the request to dispense the towel from the towel dispenser is based upon at least one signal from a proximity sensor or motion sensor associated with the towel dispenser.

* * * * *